United States Patent [19]

Ishikawa et al.

[11] Patent Number: 4,870,939
[45] Date of Patent: Oct. 3, 1989

[54] DISTRIBUTION-TYPE FUEL INJECTION SYSTEM CONTROLLED BY ELECTROMAGNETIC VALVE

[75] Inventors: Masataka Ishikawa; Nobukazu Takagi, both of Higashimatsuyama, Japan

[73] Assignee: Diesel Kiki Co., Ltd., Tokyo, Japan

[21] Appl. No.: 247,603

[22] Filed: Sep. 22, 1988

[30] Foreign Application Priority Data

Sep. 28, 1987 [JP] Japan .................... 62-240992

[51] Int. Cl.$^4$ .................................... F02M 39/00
[52] U.S. Cl. .................... 123/506; 123/503; 123/357
[58] Field of Search ........... 123/506, 503, 501, 500, 123/357, 358, 359, 494

[56] References Cited

U.S. PATENT DOCUMENTS

| | | | |
|---|---|---|---|
| 4,506,545 | 3/1985 | Yamada | 123/503 |
| 4,541,394 | 9/1985 | Schechter | 123/458 |
| 4,603,669 | 8/1986 | Takemoto | 123/503 |
| 4,714,068 | 12/1987 | Nagase | 123/506 |
| 4,718,391 | 1/1988 | Rembold | 123/506 |
| 4,727,835 | 3/1988 | Kobayashi | 123/506 |
| 4,766,864 | 8/1988 | Ban | 123/506 |

FOREIGN PATENT DOCUMENTS

| | | |
|---|---|---|
| 53-99134 | 8/1978 | Japan . |
| 56-141026 | 11/1981 | Japan . |
| 61-268844 | 11/1986 | Japan . |
| 61-286716 | 12/1986 | Japan . |

Primary Examiner—Carl Stuart Miller

[57] ABSTRACT

In a fuel injection system having a distribution-type fuel injection pump, fuel is supplied successively to cylinders of an engine from a pressurizing chamber of the pump. The pressurizing chamber communicates with a low-pressure chamber through a relief passageway opened and closed by an electromagnetic valve. During a stroke in which volume of the pressurizing chamber is reduced by each forward stroke of a plunger, opening and closing of the valve are controlled, to control starting timing and/or termination timing of fuel injection to the cylinders. A delay occurs in the starting timing and/or the termination timing with respect to drive pulses supplied to the valve, due to an operation delay of the valve. A plurality of memory sections are provided for storing therein delay times for the respective cylinders. A starting point or a termination point of the drive pulse is advanced correspondingly to the delay times stored respectively in the memory sections, at fuel injections with respect to the respective cylinders.

3 Claims, 6 Drawing Sheets

Fig. 2
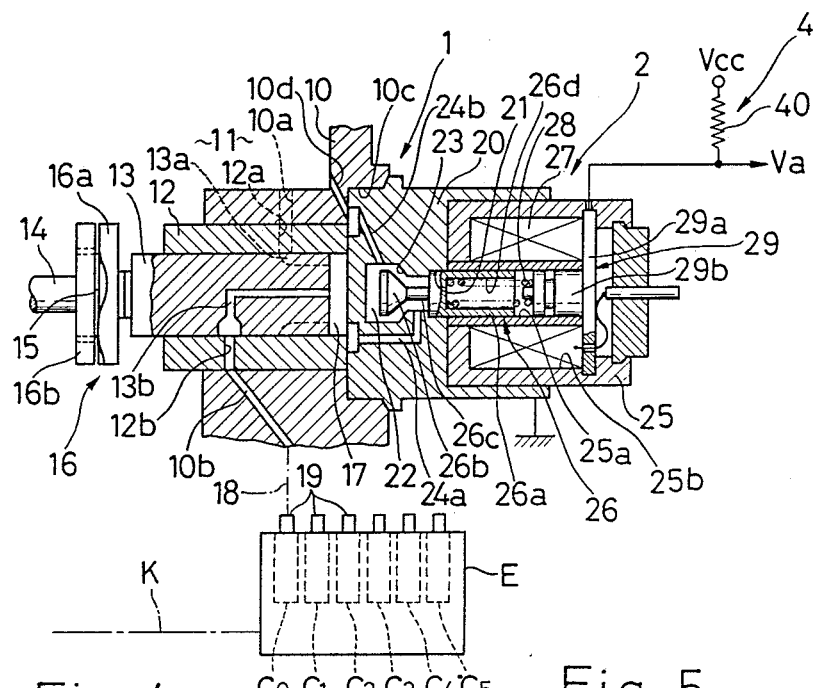
Fig. 4
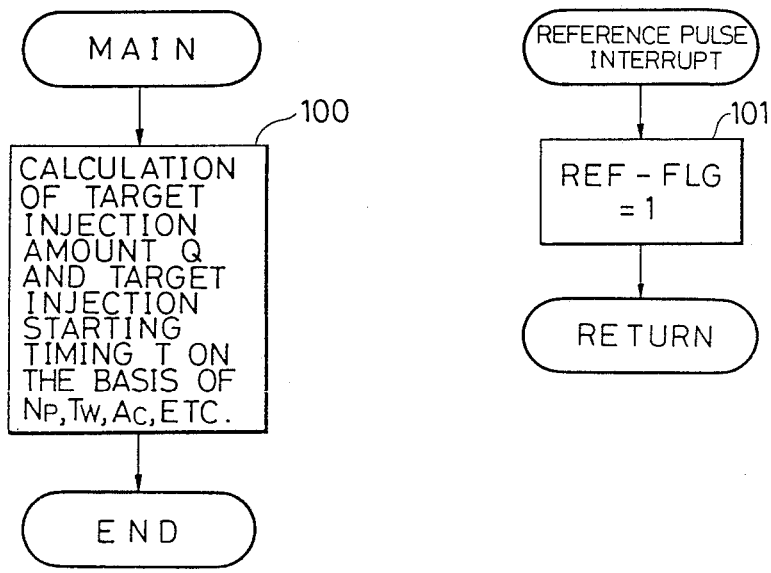
Fig. 5

DISTRIBUTION-TYPE FUEL INJECTION SYSTEM CONTROLLED BY ELECTROMAGNETIC VALVE

BACKGROUND OF THE INVENTION

The present invention relates to a distribution-type fuel injection system controlled by an electromagnetic valve.

A fuel injection system employing a distribution-type fuel injection pump controlled by an electromagnetic valve is known as one of fuel injection systems for use in diesel engines.

The distribution-type fuel injection pump comprises a housing having a low-pressure chamber defined therein. A plunger barrel is mounted to the housing. A plunger is fitted in the plunger barrel for axially reciprocative movement and for rotation relative to the plunger barrel.

A fuel pressurizing chamber is defined by an end face of the plunger and an inner peripheral surface of the plunger barrel. Forward movement of the plunger reduces the volume of the fuel pressurizing chamber, while backward or return movement of the plunger increases the volume of the fuel pressurizing chamber. During one revolution of the plunger, the plunger reciprocates several times corresponding in number to cylinders of the engine. At the forward strokes of the plunger, the fuel pressurizing chamber is brought into communication successively with fuel injection valves of the engine through a passage formed in the plunger, a plurality of ports formed in the plunger barrel, a plurality of passages formed in the housing and a plurality of delivery valves.

The fuel pressurizing chamber communicates with the low-pressure chamber through a relief passage formed in the housing The relief passage is adapted to be opened and closed by the electromagnetic valve. Fuel is permitted to escape from the fuel pressurizing chamber to the low-pressure chamber through the relief passage, for a period of time within which the electromagnetic valve is opened, during each forward stroke of the plunger. On the other hand, for a period of time within which the electromagnetic valve is closed during each forward stroke of the plunger, the fuel is supplied to a corresponding one of the engine cylinders from the fuel pressurizing chamber through a corresponding one of the fuel injection valves.

Accordingly, if a closing starting point of the electromagnetic valve is controlled, fuel injection starting timing can be controlled, while if an opening starting point of the electromagnetic valve is controlled, fuel injection termination timing can be controlled.

The electromagnetic valve is controlled by drive pulses outputted from a control circuit. That is, a starting point and a termination point of each drive pulse are determined in accordance with the engine running conditions, and the electromagnetic valve is closed in response to the drive pulse.

The electromagnetic valve operates in response to the drive pulse with a delay. Japanese Patent Application Laid-Open Nos. 61-286716 and 61-268844 disclose a system which comprises the above-mentioned fundamental arrangement and, in addition thereto, means for compensating for a delay in the fuel injection start-up and/or a delay in the fuel injection termination due to the delay in operation of the electromagnetic valve. Specifically, in the system, the delay time in the fuel injection start-up and/or the delay time in the fuel injection termination are/is detected with respect to the starting point and/or the termination point of the drive pulse, and the starting point and/or the termination point of the drive pulse are/is advanced correspondingly to the detected delay time or times.

The system disclosed in the above Japanese patents compensates for the delay time in the injection start-up and/or the delay time in the injection termination each time the fuel is injected into each cylinder, on the assumption that the delay times in the respective operations of the electromagnetic valve with respect to the engine cylinders are equal to each other. That is, the drive pulse is outputted by the control circuit in such a manner that the delay time or times detected at the fuel injection operation with respect to one cylinder is or are compensated for at the fuel injection operation with respect to the subsequent cylinder.

In practice, however, the delay times in the respective fuel injection operations of the electromagnetic valve with respect to the cylinders are different from each other. Accordingly, it is inevitable for the system disclosed in the above Japanese patents that variation occurs in the fuel injection starting timings and/or in the fuel injection termination timings for the respective cylinders.

The reason why the operation delay times in the electromagnetic valve are different from each other for the respective cylinders in spite of the fact that the electromagnetic valve is common to the cylinders is as follows. That is, because of processing errors of the delivery valves and because of a difference in position among the ports formed in the plunger barrel, the pressure within the fuel pressurizing chamber varies depending upon the fuel injection operations of the fuel injection pump with respect to the respective cylinders. Thus, the fuel pressure acting upon a valve member of the electromagnetic valve and flow of the fuel relative to the valve member vary delicately.

The above Japanese Patent Application Laid-Open No. 61-286716 corresponds to U.S. Pat. No. 4,748,447, and Japanese patent application Laid-Open No. 61-268844 corresponds to U.S. Ser. No. 865,125 filed on May 20, 1986.

Apart from the above, Japanese Patent Application Laid-Open No. 56-141026 discloses a distribution-type fuel injection system in which engine rotational speeds corresponding to expansion strokes of respective pistons within engine cylinders are detected to control an electromagnetic valve in such a manner that the rotational speeds are brought into coincidence with each other.

Japanese patent application Laid-Open No. 53-99134 discloses a fuel injection system which is different from that of distribution type, but which comprises means for compensating for a delay in closing operation of an electromagnetic valve.

SUMMARY OF THE INVENTION

It is an object of the invention to provide a distribution-type fuel injection system controlled by an electromagnetic valve, in which a delay time in a fuel injection start-up and/or a delay time in a fuel injection termination due to a delay in the operation of the electromagnetic valve are/is detected each time fuel is injected into each of cylinders, and in which a starting point and/or a termination point of each drive pulse supplied to the electromagnetic valve are/is advanced correspondingly to the delay time in the fuel injection start-up and/or the delay time in the fuel injection termination each time the fuel is injected into the same cylinder, whereby starting timing and/or termination timing of the fuel injection can accurately be controlled without variation among the cylinders.

According to the invention, there is provided a distribution-type fuel injection system controlled by an electromagnetic valve, comprising:

(a) a distribution-type fuel injection pump including;
  (i) pump housing means having a low-pressure chamber,
  (ii) plunger barrel means mounted to the pump housing means,
  (iii) a plunger fitted in the plunger barrel means for rotation and for reciprocative movement,
  (iv) a fuel pressurizing chamber defined by an inner peripheral surface of the plunger barrel means and one end face of the plunger, the fuel pressurizing chamber being variable in volume by the reciprocative movement of the plunger,
  (v) supply passage means through which fuel within the low-pressure chamber is supplied to the fuel pressurizing chamber,
  (vi) forcible-delivery passage means through which the fuel within the fuel pressurizing chamber is supplied successively to a plurality of injection valves mounted respectively to a plurality of cylinders of an engine, and
  (vii) relief passage means through which the fuel is permitted to escape from the fuel pressurizing chamber to the low-pressure chamber, (b) an electromagnetic valve mounted to the pump housing means of the fuel injection pump, for controlling opening and closing of the relief passage means, wherein for a period of time within which the electromagnetic valve is opened during each forward stroke of the plunger decreasing the volume of the fuel pressurizing chamber, the fuel is permitted to escape from the fuel pressurizing chamber to the low-pressure chamber through the relief passage means, while for a period of time within which the electromagnetic valve is closed during the forward stroke of the plunger, the fuel is permitted to be supplied to the fuel injection valves from the fuel pressurizing chamber through the forcible-delivery passage means;

(c) running-condition detecting means for detecting running conditions of the engine;

(d) target timing arithmetic means for calculating a target fuel injection starting timing and/or a target fuel injection termination timing, on the basis of a detecting signal from the running-condition detecting means;

(e) rotation detecting means for detecting substantially a rotational position of the engine;

(f) cylinder detecting means for detecting which one of the cylinders is a subject of fuel injection operation of the fuel injection pump, on the basis of a detecting signal from the rotation detecting means;

(g) timing detecting means for detecting substantially actual fuel injection starting timings and/or actual fuel injection termination timings for the respective cylinders;

(h) delay time detecting means for detecting, in the fuel injection operations of the fuel injection pump for the respective cylinders, injection starting delay times and/or injection termination delay times for the respective cylinders, on the basis of respective differences between the actual fuel injection starting timings detected by the timing detecting means and starting points of below-mentioned drive pulses for the respective cylinders and/or on the basis of respective differences between the actual injection termination timings detected by the timing detecting means and termination points of the drive pulses for the respective cylinders;

(i) timing compensating means for executing calculation in such a manner as to advance the starting point and/or the termination point of the drive pulse correspondingly to the injection starting delay time and/or the injection termination delay time, with respect to the target injection starting timing and/or the target injection termination timing, each time the fuel injection operation is carried out for each cylinder;

(j) drive pulse generating means for outputting the drive pulses to a drive circuit for the electromagnetic valve, on the basis of the respective starting points and/or the respective termination points calculated by the timing compensation means;

(k) delay time memory means having a plurality of memory sections corresponding respectively to the cylinders, for storing the detected delay times into the respective memory sections; and (l) selecting means for writing each of the injection starting delay times and/or each of the injection termination delay times detected at the fuel injection operation with respect to a corresponding one of the cylinders, to the memory section or sections corresponding to the cylinder, on the basis of information from the cylinder detecting means, the selecting means reading the injection starting delay time and/or the injection termination delay time, out of the memory section or sections corresponding to the cylinder which is to be a subject of fuel injection, on the basis of the information from the cylinder detecting means, to supply the read-out delay time or times to the timing compensating means.

BRIEF DESCRIPTION OF THE DRAWINGS

FIG. 2 is a cross-sectional view showing a specific example of a fuel injection pump illustrated in FIG. 1;

FIGS. 4 through 7 are flow charts of programs executed by a microcomputer illustrated in FIG. 3;

DETAILED DESCRIPTION

Figure 1:
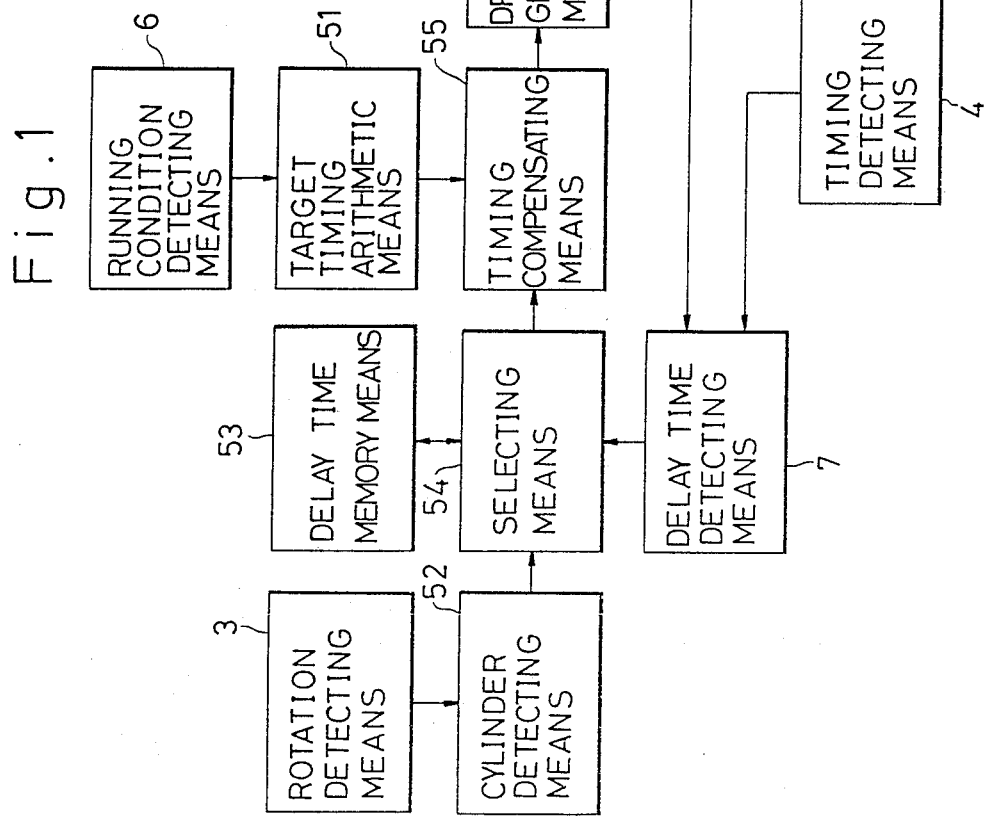
FIG. 1 is a circuit block diagram showing a basic or fundamental arrangement of the invention.

Referring to FIG. 1, there is shown a basic arrangement of the invention. A distribution-type fuel injection pump 1 has an electromagnetic valve 2 associated therewith. Circuit means for controlling the electromagnetic valve 2 will be described below.

Running-condition detecting means 6 detects running conditions of an engine. On the basis of data concerning the detected running conditions, target timing arithmetic means 51 calculates target fuel injection starting timing and/or target fuel injection termination timing.

Rotation detecting means 3 obtains information substantially concerning rotation of the engine. On the basis of the rotation information from the rotation detecting means 3, cylinder detecting means 52 detects one of cylinders that is a subject of fuel injection.

Timing detecting means 4 detects substantially actual fuel injection starting timing and/or actual fuel injection termination timing.

At each of fuel injection operations with respect to the respective cylinders, delay time detecting means 7 detects a time difference between the actual fuel injection starting timing from the timing detecting means 4 and the starting point of the drive pulse and/or a time difference between the actual fuel injection termination timing and the termination point of the drive pulse, that is, a delay time in the fuel injection start-up and/or a delay time in the fuel injection termination due to a delay in the operation of the electromagnetic valve 2.

Delay time memory means 53 has a plurality of memory sections corresponding to the respective cylinders of the engine.

On the basis of the information from the cylinder detecting means 52, selecting means 54 writes the detected fuel injection starting delay time and/or the detected fuel injection termination delay time from the delay time detecting means 7, onto the memory section or sections corresponding to the cylinder that is a subject of fuel injection. Further, the selecting means 54 reads the fuel injection starting delay time and/or the fuel injection termination delay time, out of the memory section or sections corresponding to the cylinder which is to be a subject of fuel injection when the fuel injection pump attempts to perform the fuel injection operation.

Timing compensating means 55 advances the starting point and/or the termination point of each drive pulse, correspondingly to the delay time or times read out by the selecting means 54, with respect to the target injection starting timing and/or the target injection termination timing, thereby determining the starting point and/or the termination point of the drive pulse.

Drive pulse generating means 8 outputs the drive pulses successively to a drive circuit 9 for the electromagnetic valve 2 of the fuel injection pump 1, at the timing determined by the timing compensating means 55.

At the fuel injection operation with respect to each cylinder, the delay time or times is/are compensated for, whereby it is possible to eliminate variation in the injection starting timing and/or the injection termination timing, in spite of the difference in delay time from cylinder to cylinder.

A specific example of the above-mentioned distribution-type fuel injection pump 1 is shown in FIG. 2. The fuel injection pump 1 is designed to supply fuel to a four-cycle diesel engine E having six cylinders $C_0$ through $C_5$. The fuel injection pump 1 comprises a pump housing 10 whose interior is formed into a low-pressure chamber 11. The low-pressure chamber 11 is filled with low-pressure fuel from a feed pump (not shown) mounted to the pump housing 10.

A plunger barrel 12 is fixedly fitted in a bore formed through one of opposite side walls of the pump housing 10. A plunger 13 is fitted in the plunger barrel 12 for axially reciprocative movement and for rotation relative to the plunger barrel 12.

A drive shaft 14 is rotatably supported by the other side wall (not shown) of the pump housing 10 in coaxial relation to the plunger 13. The drive shaft 14 has one end thereof located within the pump housing 10. The other end of the drive shaft 14 is located exteriorly of the pump housing 10. The other end of the drive shaft 14 is drivingly connected to a crankshaft K of the engine E through a reduction gear mechanism in such a manner that rotational speed of the crankshaft K is reduced to a half, and the half rotational speed is transmitted to the drive shaft 14.

The plunger 13 has one end thereof which is connected to the one end of the drive shaft 14 through a coupler 15 in such a manner that rotation is permitted to be transmitted from the drive shaft 14 to the plunger 13, and the plunger 13 is axially movable relatively to the drive shaft 14.

The plunger 13 is reciprocated axially by a cam mechanism 16 which comprises a face cam 16a connected to the one end of the plunger 13 and a roller holder 16b supported by the pump housing 10. The roller holder 16b is annular in shape. The roller holder 16b surrounds the aforesaid coupler 15 and is opposed to the face cam 16a. A plurality of rollers (not shown) are supported rotatably on an axial end face of the roller holder 16b on the side of the face cam 16a. The face cam 16a is in contact with the rollers under biasing force of a spring (not shown). Accordingly, when the plunger 13 rotates together with the drive shaft 14, the face cam 16a connected to the plunger 13 also rotates, so that the plunger 13 is reciprocated axially under the cam action of the face cam 16a and the rollers. The plunger 13 is reciprocated six times during one revolution thereof, correspondingly to the number of the cylinders $C_0$ through $C_5$.

A fuel pressurizing chamber 17 is defined by an inner peripheral surface of the plunger barrel 12 and the other axial end face of the plunger 13. The fuel pressurizing chamber 17 has its volume which decreases during each forward stroke of the plunger 13, but which increases during each return stroke of the plunger 13.

In the vicinity of the termination point of time of the return stroke of the plunger 13, the fuel pressurizing chamber 17 is brought into communication with the low-pressure chamber 11 through a passage 10a formed in the pump housing 10, a passage or a port 12a formed in the plunger barrel 12, and a selected one of six axial grooves 13a formed in the outer peripheral surface of the other end portion of the plunger 13. Thus, fuel within the low-pressure chamber 11 is drawn into the fuel pressurizing chamber 17. The passages 10a and 12a and the grooves 13a serve as supply passage means.

The plunger 13 is formed therein with a passage 13b whose one end opens to the end face of the plunger 13. The other end of the passage 13b opens to the outer peripheral surface of the plunger 13. The plunger barrel 12 is formed therein with six passages or ports 12b. Six passages 10b are formed in the wall of the pump housing 10. Each of the passages 10b has one end thereof connected to a corresponding one of the passages 12b. The other end of the passage 10b is connected to a corresponding one of delivery valves (not shown) mounted to the wall of the pump housing 10. The delivery valves are connected respectively to injection valves 19 through pipes 18. The injection valves 19 are mounted respectively to the cylinders $C_0$ through $C_5$ of the engine E. The passages 10b, 12b and 13b serve as forcible-delivery passage means.

During each forward stroke of the plunger 13, which reduces the volume of the fuel pressurizing chamber 17, the fuel pressurizing chamber 17 is brought into communication with a corresponding one of the delivery valves and with a corresponding one of the injection valves 19, through the passage 13b in the plunger 13, a corresponding one of the six passages 12b in the plunger barrel 12b and a corresponding one of the passages 10b in the wall of the pump housing 10.

A specific example of the electromagnetic valve 2 is also shown in FIG. 2. The electromagnetic valve 2 is of normally open type, and is mounted to the wall of the pump housing 10. The electromagnetic valve 2 comprises a valve body 20 whose one end is fixedly fitted in a recess 10c formed in the side wall of the pump housing 10. The valve body 20 is formed therein with an axially extending guide bore 21 and a valve chamber 22 contiguous thereto. A valve seat 23 is formed at a junction between the guide bore 21 and the valve chamber 22. The valve chamber 22 communicates with the fuel pressurizing chamber 17 through a passage 24a formed in the valve body 20. The valve chamber 22 also communicates with the low-pressure chamber 11 through another passage 24b formed in the valve body 20 and a relief passage 10d formed in the side wall of the pump housing 10.

The electromagnetic valve 2 has a case 25 mounted to the valve body 20. The case 25 is formed therein with a guide bore 25a contiguous to the guide bore 21 in the valve body 20 in coaxial relation thereto. An annular recess 25d is formed in the case 25 and surrounds the guide bore 25a. An inner peripheral wall of the case 25 surrounding the guide bore 25a is formed of nonmagnetic material, while an outer peripheral wall of the case 25 surrounding the recess 25b and an axial end wall of the case 25 are formed of magnetic material.

The electromagnetic valve 2 further includes a valve member 26 which is composed of a stem 26a accommodated in the guide bores 21 and 25a for axial sliding movement, a head 26b accommodated in the valve chamber 22, and a neck 26c connecting the stem 26a and the head 26b to each other. A recess 26d is formed in the stem 26a of the valve member 26, and a coil spring 28 is accommodated in the recess 26d.

An exciting coil 27 is accommodated in the recess 25b in the case 25. A spring retainer 29 has a flange 29a which closes the guide bore 25a and the recess 25b in the case 25. The spring retainer 29 has a stem 29b which is fitted in the guide bore 25a and which receives one end of the coil spring 28.

When the exciting coil 27 is deenergized, the valve member 26 is biased to the left by the coil spring 28, so that the head 26b is spaced apart away from the valve seat 23. Thus, the electromagnetic valve 2 is brought to its open position. On the other hand, when the exciting coil 27 is energized, the valve body 26 is moved to the right under the magnetic force of the exciting coil 27 against the biasing force of the coil spring 28, so that the head 26b is abutted against the valve seat 23. Thus, the electromagnetic valve 2 is brought to its closed position.

During each forward stroke of the plunger 13 and when the electromagnetic valve 2 is opened, the fuel within the fuel pressurizing chamber 17 is permitted to escape to the low-pressure chamber 11 through the passage 24a, the valve chamber 22 and the passage 24b in the electromagnetic valve 2 and through the relief passage 10d in the pump housing 10. Accordingly, the fuel injection is not performed. On the other hand, during the forward stroke of the plunger 13 and when the electromagnetic valve 2 is closed, the fuel within the fuel pressurizing chamber 17 is not permitted to escape to the low-pressure chamber 11, but is supplied to a corresponding one of the injection valves 19. Thus, the fuel injection takes place.

In the manner described above, the closing starting point of the electromagnetic valve 2 corresponds to the fuel injection starting timing, while the opening starting point corresponds to the fuel injection termination timing. Further, a period of time, within which the electromagnetic valve 2 is maintained closed, corresponds to an injection period, in turn, a fuel injection amount.

In the fuel injection pump 1, the plunger 13 reciprocates six times, each time the drive shaft 14 makes one revolution about its axis. The electromagnetic valve 2 effects the closing operation at each reciprocation of the drive shaft 14, to cause the fuel to be injected into a corresponding one of the six cylinders $C_0$ through $C_5$.

The means 4 for detecting the fuel injection timing shown in FIG. 1 is embodied as a sensor for detecting opening and closing of the electromagnetic valve 2, as shown in FIG. 2. The opening-closing detecting sensor 4 has a resistor 40 whose one end is connected to a positive pole of an electric power source $V_{cc}$. The other end of the resistor 40 is connected to the electromagnetic valve 2. Voltage $V_a$ at the other end of the resistor 40 serves as a detecting voltage representative of opening and closing of the electromagnetic valve 2. Specifically, the electrically conductive spring retainer 29 is connected to the other end of the resistor 40, while the electrically conductive valve body 21 is connected to the earth or ground. The spring retainer 29 is coated with electrically insulating material, except for the left-hand end face of the stem 29b as viewed in FIG. 2, so that the spring retainer 29 is electrically insulated from the case 25. Electrically insulating material is applied only to the outer peripheral surface and the left-hand end face of the stem 26a of the electrically conductive valve member 26, so that the valve member 26 is electrically insulated from the valve body 21 and the case 25. Accordingly, the detecting voltage $V_a$ at the other end of the resistor 40 of opening-closing detecting sensor 4 is brought to a low level, when the electromagnetic valve 2 is in the closed position where the head 26b of the valve member 26 is abutted against the valve seat 23 of the valve body 21. On the other hand, the detecting voltage $V_a$ is brought to a high level, when the electromagnetic valve 2 is in the open position where the head 26b of the valve body 26 is spaced apart away from the valve seat 23. Accordingly, a point of time the detecting voltage $V_a$ is switched from the high level to the low level indicates the closing timing of the electromagnetic valve 2, while a point of time the detecting voltage $V_a$ is switched from the low level to the high level represents the opening timing of the electromagnetic valve 2.

In the illustrated embodiment, it is assumed that the closing timing of the electromagnetic valve 2 is substantially coincident with the injection starting timing, and the opening timing of the electromagnetic valve 2 is substantially coincident with the injection termination timing.

Figure 3:
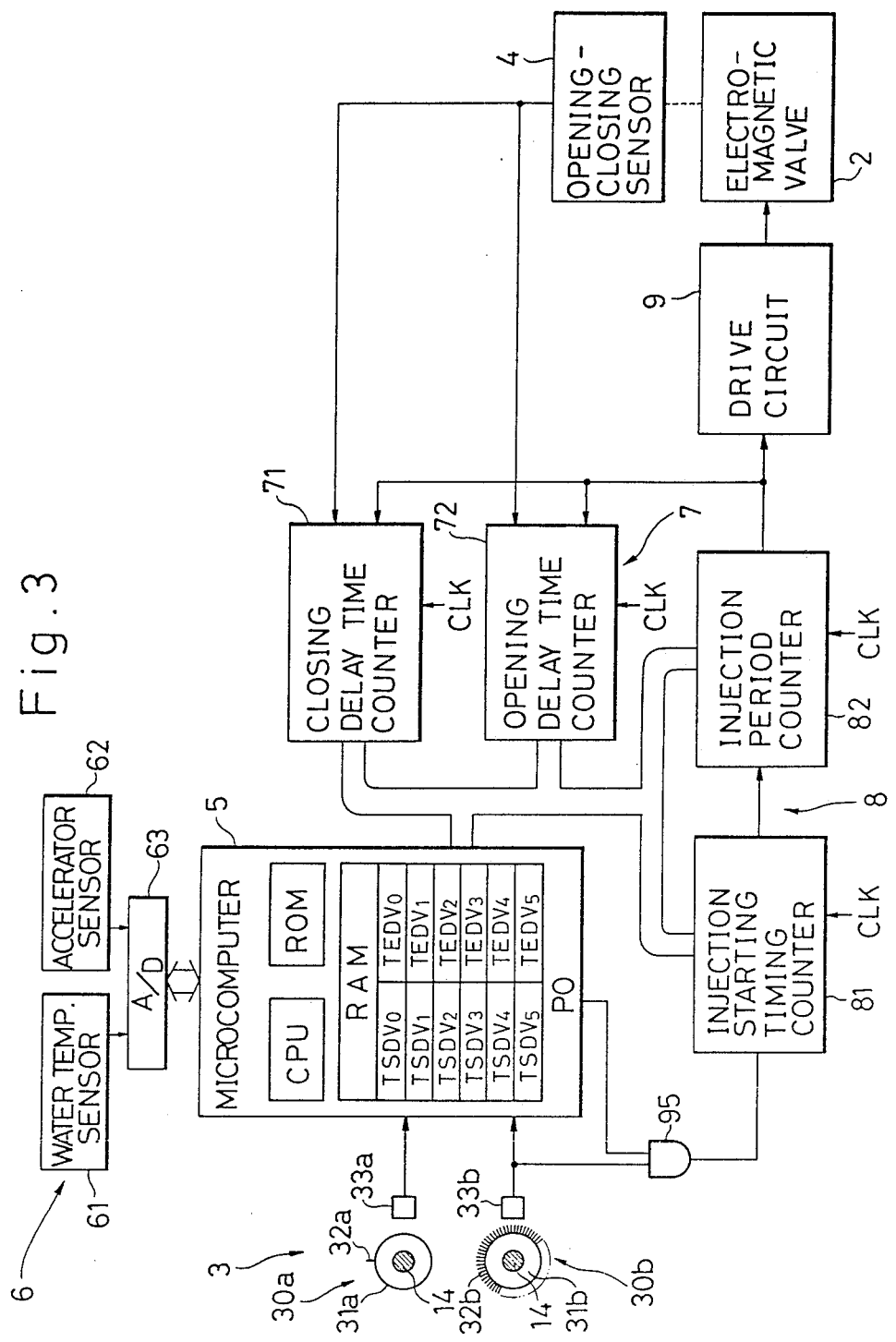
FIG. 3 is a circuit block diagram showing a specific example of the system circuit illustrated in FIG. 1.

The above-mentioned rotation detecting means 3 comprises reference pulse generating means 30a and scale pulse generating means 30b, as shown in FIG. 3. The pulse generating means 30a includes a pulser 31a fixedly mounted to a portion of the drive shaft 14 projecting out of the pump housing 10, and an electromagnetic pickup coil 33a arranged in slightly spaced relation to an outer periphery of the pulser 31a. Likewise, the pulse generating means 30b includes a pulser 31b and an electromagnetic pickup coil 33b. A single cog 32a is mounted to the outer periphery of the pulser 31a of the reference pulse generating means 30a. On the other hand, thirty-six (36) cogs 32b, for example, are mounted to the peripheral surface of the pulser 31b of the scale pulse generating means 30b and are arranged in circumferentially spaced relation to each other at intervals of 10°.

The electromagnetic pickup coil 33a of the reference pulse generating means 30a outputs a single reference pulse each time the drive shaft 14 makes one revolution. On the other hand, the electromagnetic pickup coil 33b of the scale pulse generating means 30b outputs a scale pulse each time the drive shaft 14 moves angularly about its axis by 10°.

FIG. 3 shows specific circuit means for controlling the electromagnetic valve 2. The control circuit means comprises a microcomputer 5 which has its basic components including a central processing unit CPU, a ROM (read-only memory) having programs stored therein, and a RAM (random access memory) for storing therein data. The microcomputer 5 executes various programs subsequently to be described and, accordingly, is provided substantially with respective functions of the target timing arithmetic means 51, the cylinder detecting means 52, the selecting means 54 and the timing compensating means 55 shown in FIG. 1.

Memory areas of the RAM designated respectively by $TSDV_0$ through $TSDV_5$ are used to store respectively the closing delay times of the electromagnetic valve 2 in the fuel injection operations with respect to the respective cylinders $C_0$ through $C_5$. In addition, the memory areas of the RAM designated respectively by $TEDV_0$ through $TEDV_5$ are used to store respectively the opening delay times of the electromagnetic valve 2 in the fuel injection operations with respect to the respective cylinders $C_0$ through $C_5$.

The reference pulses from the electromagnetic pickup coil 33a and the scale pulses from the electromagnetic pickup coil 33b are inputted to the microcomputer 5 through a waveform shaping circuit (not shown). Further, detecting signals from a water temperature sensor 61 and an accelerator sensor 62, which serve as the running condition detecting means 6, are inputted also to the microcomputer 5 through an A/D converter 63.

The above-mentioned control circuit means further includes a closing delay time counter 71 and an opening delay time counter 72, which serve as the delay time detecting means 7, and an injection starting timing counter 81 and an injection period counter 82, which serve as the drive pulse generating means 8. In addition, the control circuit means includes an AND circuit 95.

The operation of the fuel injection system constructed as above will be described below.

Prior to the description of the operation, a reference rotational position and a sub-reference rotational position of the drive shaft 14 will first be explained. The reference rotational position represents a rotational position of the drive shaft 14 or a crankshaft K, which corresponds to a specific position prior to arrival of a piston at the top dead center during a compression stroke of the No. 0 (zero) cylinder $C_0$. The drive shaft 14 reaches the reference rotational position at the point of time No. 0 (zero) scale pulse is outputted just after the reference pulse has been outputted. The sub-reference rotational position represents a rotational position of the drive shaft 14 or the crankshaft K, which corresponds to a specific position prior to arrival of the piston at the top dead center during the compression stroke of each of the No. 0 to No. 5 cylinders $C_0$ through $C_5$. As will be clear from the above explanation, the sub-reference rotational position corresponding to the No. 0 cylinder $C_0$ is the same as the reference rotational position.

The electromagnetic valve 2 is closed when the drive circuit 9 receives the drive pulse of the low level from the injection period counter 82. The closing delay time detecting counter 71 is reset in response to a fall of the drive pulse, to start to count the clock pulses CLK. The counter 71 stops its counting operation in response to a fall of the detecting output $V_a$ from the opening-closing detecting sensor 4. As a result, the counter 71 counts a period of time from the starting point of the drive pulse to a point of time the electromagnetic valve 2 is closed actually, that is, a number of clock pulses corresponding to the closing delay time of the electromagnetic valve 2. On the other hand, the opening delay time detecting counter 72 is reset in response to a rise of the drive pulse, to start to count the clock pulses CLK. The counter 72 stops its counting operation in response to a rise of the detecting output $V_a$ from the opening-closing sensor 4. As a consequence, the counter 72 counts a period of time from the termination point of the drive pulse to a point of time the electromagnetic valve 2 is opened actually, that is, a number of clock pulses corresponding to the opening delay time of the electromagnetic valve 2.

As shown in FIG. 4, at a step 100 of a main routine, the microcomputer 5 calculates a target fuel injection amount Q and a target injection starting timing T on the basis of information representative of the running conditions of the engine E including a rotational speed $N_p$ of the drive shaft 14 or the plunger 13 of the fuel injection pump 1, an accelerator position $A_c$ from the accelerator sensor 62, an engine cooling water temperature $T_w$ from the water temperature sensor 61, and the like. In this connection, the target injection starting timing T is represented by the rotational angle of the drive shaft 14 from the subreference rotational position. The calculation result of the target injection amount Q is converted to a target injection period to be described later. The target injection starting timing T and the target injection period substantially result in calculation of the target injection termination timing.

When the reference pulse is inputted to the microcomputer 5 from the electromagnetic pickup coil 33a, an interrupt routine shown in FIG. 5 is executed, to bring a flag REF-FLG to "1" at a step 101.

Figure 6:
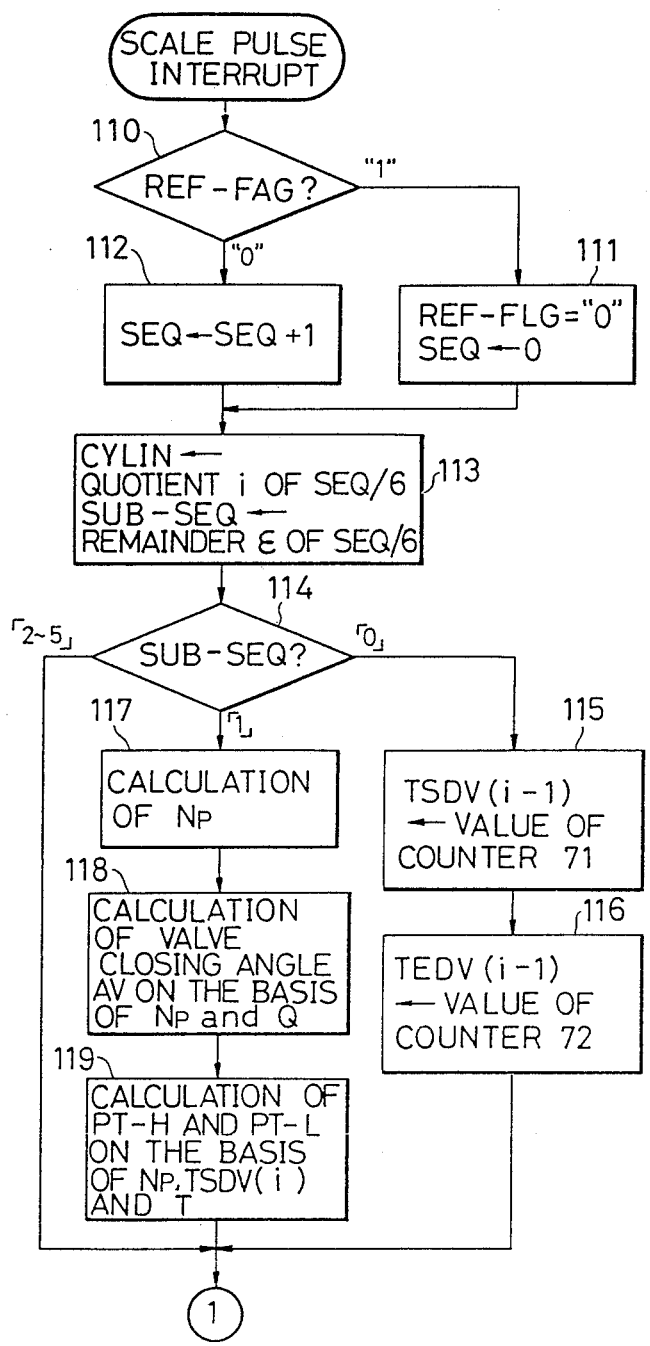
Figure 7:
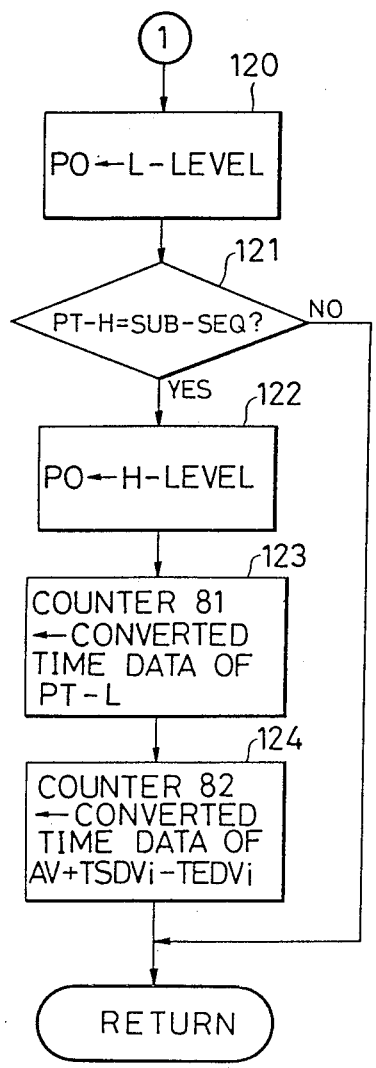

When the scale pulse is inputted to the microcomputer 5 from the electromagnetic pickup coil 33b, an interrupt routine shown in FIGS. 6 and 7 is executed. Specifically, it is judged at a step 110 whether or not the REF-FLG is "1". If the judgment indicates that the REF-FLG is "1", the REF-FLG is brought to "0" at a step 111, and a register or the memory area SEQ of the RAM is brought to [0]. On the other hand, if the judgment at the step 110 indicates that the REF-FLG is "0", 1 is added to the value stored in the SEQ at a step 112.

As will be clear from the above description, at the steps 110 through 112, the number of the scale pulse inputted to the microcomputer 5 from the reference pulse is detected (in the embodiment, the scale pulse corresponds to one of the numbers 0 through 35), and the detected number is stored in the SEQ.

At a subsequent step 113, the number in the SEQ is divided by the number of the scale pulses to be counted for each cylinder, that is, by 6. The thus obtained quotient i is written to the register or the memory area CYLIN of the RAM, and the remainder $\epsilon$ is written to the register or the memory area SUB-SEQ of the RAM.

The quotient i represents the number of the cylinder that is a subject of fuel injection. The cylinder is under a stroke of a predetermined range including a part of the compression stroke and a part of the expansion stroke.

The remainder $\epsilon$ represents, in terms of 10°, the rotational angle of the plunger 13 from the subreference rotational position of the drive shaft 14. In the embodiment, the remainder $\epsilon$ takes a value of integer that is one of [0] through [5]. In this connection, the scale pulse corresponding to the sub-reference position is No. 0.

In a subsequent step 114, the value in the SUB-SEQ is judged. If the judgment indicates [0], the detecting value at the closing delay time detecting counter 71 is written to the TSDV(i−1) at a step 115. The detecting value at the opening delay time detecting counter 72 is written to the TEDV(i−1) at a step 116. These TSDV(i−1) and TEDV(i−1) are registers or the memory areas of the RAM corresponding to the cylinder $C_{i-1}$ prior to the cylinder $C_i$ which is currently a subject of fuel injection operation.

If it is judged at the step 114 that the SUB-SEQ SEQ is [1], a counting value of a free running counter is read at a step 117, and a time interval between each pair of adjacent scale pulses is measured on the basis of a difference between the read counting value and a counting value of the free running counter at inputting of the previous scale pulse. On the basis of the measured difference, the rotational speed $N_p$ of the pump 1 is calculated. At a subsequent step 118, a target rotational angle range (hereinafter referred to as "valve closing angle") AV of the drive shaft 14 in the state in which the electromagnetic valve 2 is closed, is calculated on the basis of the rotational speed $N_p$ of the pump 1 and the target injection amount Q.

At a subsequent step 119, the closing delay time is read, which has been stored in the memory area TSDV(i) corresponding to the cylinder $C_i$ that is a current subject of the fuel injection operation. The read closing delay time is converted to the rotational angle of the drive shaft 14, on the basis of the rotational speed $N_p$. Further, the converted-angle value of the closing delay time is subtracted from the target injection starting timing T, to obtain a target starting point of the drive pulse. In this connection, the target starting timing is represented by the rotational angle of the drive shaft 14 from the sub-reference rotational position, and is compensated for the closing delay time of the electromagnetic valve 2.

At the step 119, 10° that is the angular interval between each pair of adjacent cogs 32b is first subtracted from the angle data of the compensated target starting point of the drive pulse, and the subtracted value is divided by 10°, to obtain a quotient and the remainder. The quotient is written to a register or a memory area PT-H of the RAM, and the remainder is written to a memory area PT-L.

The value in the PT-L represents the rotational angle (less than 10°) of the drive shaft 14 from a rotational position corresponding to the scale pulse inputted to the microcomputer 5 just before the target starting point of the drive pulse, to a rotational position corresponding to the target starting point of the drive pulse. On the other hand, the value in the PT-H represents the number to be applied to a scale pulse before the scale pulse just before the target starting timing.

When it is judged at the step 114 that the value in the SUB-SEQ is one of [2] to [5], the steps 115 through 119 are passed.

At a subsequent step 120, a control output port PO of the microcomputer 5 is brought to a low level. At a subsequent step 121, it is judged whether or not the value in the SUB-SEQ is coincident with that of the PT-H. If the judgment is affirmative, the output port PO is brought to a high level at a subsequent step 122. In this connection, the output from the output port PO is returned to the low level at the step 120 in the subsequent scale pulse interrupt routine.

At a step 123, the value in the PT-L is converted to time data from the angle data on the basis of the rotational speed $N_p$. The converted time data are sent to the injection starting timing counter 81.

At a step 124, the target valve closing angle AV is converted to time data on the basis of the rotational speed $N_p$. The closing delay time and the opening delay time are read respectively out of the TSDV(i) and the TEDV (i). The TSDV(i) and TEDV(i) correspond to the cylinder $C_i$ that is a subject of fuel injection. The closing delay time stored in the TSDV(i) is added to the converted time data of the target valve closing angle AV, and the opening delay time stored in the TEDV(i) is subtracted from the converted time data, to calculate the target injection period. In this connection, combination of the calculation of the target injection period and the calculation of the target injection starting timing results in calculation of the target injection termination timing substantially compensated for the opening delay time of the electromagnetic valve 2. The target injection period is sent to the injection period counter 82.

If it is judged at the step 121 that the value in the SUB-SEQ is not coincident with that in the PT-H, the steps 122 through 124 are passed.

Figure 8:
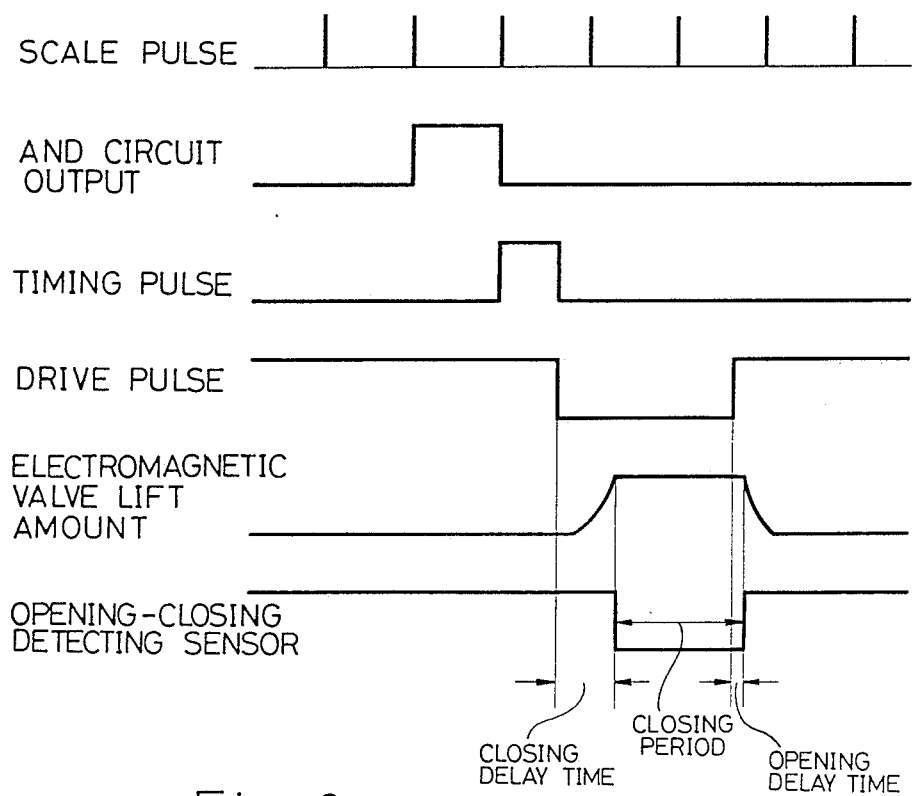
FIG. 8 is a time chart.

On the basis of the above-mentioned operation of the microcomputer 5, actions take place as indicated by the time chart shown in FIG. 8. The actions will be described below in detail.

When the step 122 is executed, the AND circuit 95 is opened, because the H-level output signal from the output port PO is inputted to the AND circuit 95. When a subsequent scale pulse is inputted to the AND circuit 95, the output from the AND circuit 95 is brought to the H-level, and the injection starting timing counter 81 is triggered by a rise of the output from the AND circuit 95. The counter 81 outputs a timing pulse and counts the clock pulses from this point of time. When the counted value is brought into coincidence with the converted time data of the PT-L sent from the microcomputer 5, outputting of the timing pulse is stopped. The injection period counter 82 is triggered in response to a fall of the timing pulse. Accordingly, the counter 82 outputs the drive pulse and counts the clock pulses from this point of time. When the counted value is brought into coincidence with the target injection period sent from the microcomputer 5, the counter 82 stops to output the drive pulse.

Figure 9:
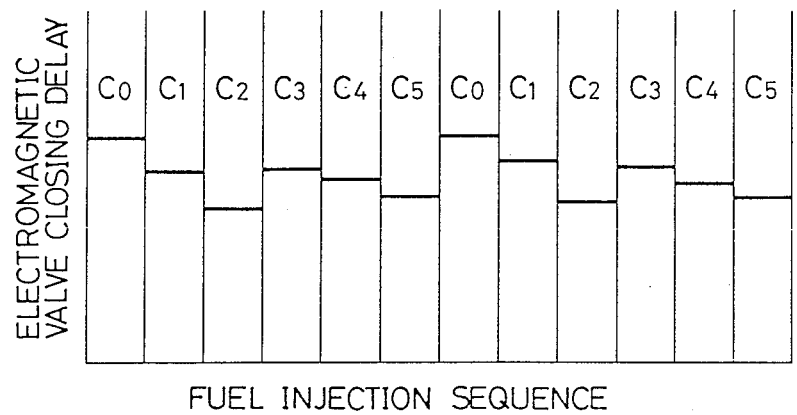
FIG. 9 is a view showing closing delay times of an electromagnetic valve for respective cylinders.

In the manner described above, in the fuel injection operation with respect to each cylinder, the starting point and the termination point of the drive pulse are advanced correspondingly to the closing delay time and the opening delay time of the electromagnetic valve 2 which are detected at the previous fuel injection operation with respect to the cylinder that is a current subject of fuel injection. By doing so, variation in the injection starting timing and the injection termination timing for each cylinder can be eliminated, even if the delay times for the respective cylinders $C_0$ through $C_5$ are different from each other as shown in FIG. 9, making it possible to control the fuel injection timing and the fuel injection amount with high accuracy. In the illustrated embodiment, it is assumed that the closing delay and the opening delay of the electromagnetic valve 2 with respect to the clock pulses are substantially equal respectively to the injection starting delay and the injection termination delay with respect to the clock pulses.

Figure 10:
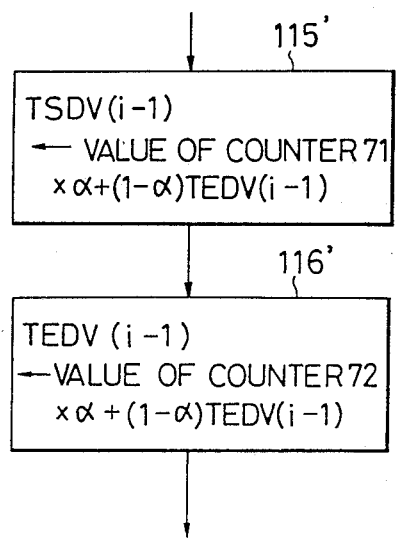
FIG. 10 is a flow chart showing only a principal portion of another aspect of the program executed by the microcomputer illustrated in FIG. 3.

The microcomputer 5 may execute steps 115' and 116' shown in FIG. 10, in place of the above steps 115 and 116. Specifically, at the step 115', a value obtained by multiplying the closing delay time calculated at the counter 71 by $\alpha$ and a value obtained by multiplying the value in the TSDV(i−1) by (1−$\alpha$) are added to each other, and the added value is written to the TSDV(i−1). Likewise, at the step 116', a value obtained by multiplying the opening delay time counted at the counter 72 by $\alpha$ and a value obtained by multiplying the value in the TEDV(i−1) by (1−$\alpha$) are added to each other, and the added value is written to the TEDV(i−1). In this connection, $\alpha$ is a value larger than 0, but smaller than 1. By these calculations, the closing delay time and the opening delay time of the electromagnetic valve 2 are determined respectively on the basis of the closing delay times and the opening delay times of the electromagnetic valve at the previous multiplicity of fuel injection operations.

As shown in FIG. 9, the delay times in the respective fuel injection operations of the electromagnetic valve 2 are different slightly from each other even for the same cylinder. However, execution of the steps 115' and 116' shown in FIG. 10 makes it possible to carry out the control with further high accuracy.

Moreover, the microcomputer 5 may obtain an average of the respective operation delay times of the electromagnetic valve at the plurality of fuel injection operations with respect to the same cylinder. In this case, the mean delay time is used for the timing compensation of the drive pulse.

The arrangement may be such that opening and closing of the injection valves mounted to the engine are detected, an accurate injection starting delay time or an accurate injection termination delay time is detected on the basis of the opening-closing detecting signal, and the detected accurate delay time is fed back. Accordingly, even if the fuel injection valves include processing errors, it is possible to eliminate variation in the injection timings with respect to the respective cylinders.

The injection termination delay time is shorter than the injection starting delay time, and is small in variation among the cylinders. Accordingly, control may be performed in such a manner that only the injection starting delay time is fed back to advance only the starting point of the drive pulse correspondingly to the injection starting delay time.

The injection starting timing may be controlled by a mechanical timer, and only the injection termination timing or the injection period may be controlled by the electromagnetic valve. In this case, the opening delay time of the electromagnetic valve or the injection termination delay time is detected, and the termination point of the drive pulse is advanced correspondingly to the detected delay time.

An electromagnetic valve of normally closed type may be employed in which the valve is closed when the exciting coil is deenergized.

A part or a whole of the functions of the microcomputer may be replaced by usual hardwares.

What is claimed is:

1. A distribution-type fuel injection system controlled by an electromagnetic valve, comprising:
    (a) a distribution-type fuel injection pump including;
        (i) pump housing means having a low-pressure chamber,
        (ii) plunger barrel means mounted to said pump housing means,
        (iii) a plunger fitted in said plunger barrel means for rotation and for reciprocative movement,
        (iv) a fuel pressurizing chamber defined by an inner peripheral surface of said plunger barrel means and one end face of said plunger, said fuel pressurizing chamber being variable in volume by the reciprocative movement of said plunger,
        (v) supply passage means through which fuel within said low-pressure chamber is supplied to said fuel pressurizing chamber,
        (vi) forcible-delivery passage means through which the fuel within said fuel pressurizing chamber is supplied successively to a plurality of injection valves mounted respectively to plurality of cylinders of an engine, and
        (vii) relief passage means through which the fuel is permitted to escape from said fuel pressurizing chamber to said low-pressure chamber,
    (b) an electromagnetic valve mounted to said pump housing means of said fuel injection pump, for controlling opening and closing of said relief passage means, wherein for a period of time within which said electromagnetic valve is opened during each forward stroke of said plunger decreasing the volume of said fuel pressurizing chamber, the fuel is permitted to escape from said fuel pressurizing chamber to said low-pressure chamber through said relief passage means, while for a period of time within which said electromagnetic valve is closed during the forward stroke of said plunger, the fuel is permitted to be supplied to said fuel injection valves from said fuel pressurizing chamber through said forcible-delivery passage means;
    (c) running-condition detecting means for detecting running conditions of the engine;
    (d) target timing arithmetic means for calculating a target fuel injection starting timing and/or a target fuel injection termination timing, on the basis of a detecting signal from said running-condition detecting means;
    (e) rotation detecting means for detecting substantially a rotational position of the engine;
    (f) cylinder detecting means for detecting which one of said cylinders is a subject of fuel injection operation of said fuel injection pump, on the basis of a detecting signal from said rotation detecting means;
    (g) timing detecting means for detecting substantially actual fuel injection starting timings and/or actual fuel injection termination timings for the respective cylinders;
    (h) delay time detecting means for detecting, in the fuel injection operations of said fuel injection pump for the respective cylinders, injection starting delay times and/or injection termination delay times for the respective cylinders, on the basis of respective differences between said actual fuel injection starting timings detected by said timing detecting means and starting points of below-mentioned drive pulses for the respective cylinders and/or on the basis of respective differences between said actual injection termination timings detected by said timing detecting means and termination points of the drive pulses for the respective cylinders;

(i) timing compensating means for executing calculation in such a manner as to advance the starting point and/or the termination point of the drive pulse correspondingly to the injection starting delay time and/or the injection termination delay time, with respect to said target injection starting timing and/or said target injection termination timing, each time the fuel injection operation is carried out for each cylinder;

(j) drive pulse generating means for outputting said drive pulses to a drive circuit for said electromagnetic valve, on the basis of the respective starting points and/or the respective termination points calculated by said timing compensation means;

(k) delay time memory means having a plurality of memory sections corresponding respectively to said cylinders, for storing said detected delay times into the respective memory sections; and (l) selecting means for writing each of said injection starting delay times and/or each of said injection termination delay times detected at the fuel injection operation with respect to a corresponding one of the cylinders, to said memory section or sections corresponding to the cylinder, on the basis of information from said cylinder detecting means, said selecting means reading the injection starting delay time and/or the injection termination delay time, out of the memory section or sections corresponding to the cylinder which is to be a subject of fuel injection, on the basis of the information from said cylinder detecting means, to supply the read-out delay time or times to said timing compensating means.

2. A distribution-type fuel injection system according to claim 1, wherein said selecting means writes the injection starting delay time and/or the injection termination delay time at one fuel injection operation with respect to said memory section or sections.

3. A distribution-type fuel injection system according to claim 1, further comprising delay time arithmetic means for calculating the injection starting delay time and/or the injection termination delay time to be compensated for, on the basis of the injection starting delay times and/or the injection termination delay times at a plurality of fuel injection operations with respect to the same cylinder, wherein said selecting means writes the calculated delay time or times to the corresponding memory section or sections.

* * * * *